United States Patent
Alemán et al.

(10) Patent No.: US 11,099,076 B2
(45) Date of Patent: Aug. 24, 2021

(54) GRAPHENE NANOMECHANICAL RADIATION DETECTOR

(71) Applicant: University of Oregon, Eugene, OR (US)

(72) Inventors: Benjamin J. Alemán, Eugene, OR (US); Andrew D. Blaikie, Eugene, OR (US); David J. Miller, Eugene, OR (US)

(73) Assignee: University of Oregon, Eugene, OR (US)

( * ) Notice: Subject to any disclaimer, the term of this patent is extended or adjusted under 35 U.S.C. 154(b) by 0 days.

(21) Appl. No.: 16/297,384

(22) Filed: Mar. 8, 2019

(65) Prior Publication Data

US 2019/0277702 A1 Sep. 12, 2019

Related U.S. Application Data

(60) Provisional application No. 62/640,552, filed on Mar. 8, 2018.

(51) Int. Cl.
*G01J 5/20* (2006.01)
*G01J 5/02* (2006.01)

(52) U.S. Cl.
CPC .................. *G01J 5/20* (2013.01); *G01J 5/023* (2013.01); *G01J 2005/202* (2013.01)

(58) Field of Classification Search
CPC ...... G01J 2005/202; G01J 5/023; G01J 5/046; G01J 5/20; G01J 5/44
See application file for complete search history.

(56) References Cited

U.S. PATENT DOCUMENTS

| | | | | |
|---|---|---|---|---|
| 7,375,333 | B1* | 5/2008 | Bluzer | G01J 5/08 250/338.4 |
| 9,117,934 | B2* | 8/2015 | Rosenblatt | B81C 1/00142 |
| 9,973,111 | B2* | 5/2018 | Duncan | H02N 1/00 |
| 2007/0108383 | A1* | 5/2007 | Combes | G01J 5/44 250/338.1 |
| 2010/0197063 | A1* | 8/2010 | Bluzer | H01L 31/18 438/51 |

(Continued)

FOREIGN PATENT DOCUMENTS

CN 102538949 A * 7/2012

OTHER PUBLICATIONS

Juha Hassel et al., Terahertz detection using mechanical resonators based on 2D materials. arXiv:1702.05942v1, Mon, Feb. 20, 2017.

(Continued)

*Primary Examiner* — Marcus H Taningco
(74) *Attorney, Agent, or Firm* — Lumen Patent Firm

(57) ABSTRACT

A thermo-mechanical resonating microbolometer has a graphene absorber suspended above a metallic silicon substrate to form a mechanical resonator. Microelectronic circuitry electrically connected to the graphene resonator and the metallic silicon substrate drives electronically the motion of the graphene absorber. Shifts in the mechanical resonant frequency of the graphene layer due to the absorption of incident radiation is measured electronically or using optical interferometry. A bolometer sensor array may be fabricated using such graphene microbolometer elements.

9 Claims, 6 Drawing Sheets

(56) References Cited

U.S. PATENT DOCUMENTS

| | | | | |
|---|---|---|---|---|
| 2012/0107562 A1* | 5/2012 | Bolotin | ............... | B82Y 40/00 |
| | | | | 428/156 |
| 2013/0018599 A1* | 1/2013 | Peng | ............... | H01L 29/778 |
| | | | | 702/30 |
| 2013/0062104 A1* | 3/2013 | Craighead | ............ | B81B 3/0094 |
| | | | | 174/255 |
| 2013/0170517 A1* | 7/2013 | Duraffourg | ............ | H01L 31/18 |
| | | | | 374/121 |
| 2015/0372159 A1* | 12/2015 | Englund | ............... | G01J 3/18 |
| | | | | 356/328 |
| 2016/0065169 A1* | 3/2016 | Rinaldi | ............... | H01L 41/1873 |
| | | | | 250/338.3 |
| 2018/0337324 A1* | 11/2018 | Fong | ............... | G01J 5/046 |

OTHER PUBLICATIONS

Dmitri K. Efetov et al., Fast thermal relaxation in cavity-coupled graphene bolometers with a Johnson noise read-out, Nature Nanotechnology vol. 13, pp. 797-801 (2018).

Grigory Skoblin et al., Graphene bolometer with thermoelectric readout and capacitive coupling to an antenna, Appl. Phys. Lett. 112, 063501 (2018).

Blaikie et al., A fast, sensitive, room-temperature graphene nanomechanical bolometer. arXiv:1810.13422 Oct. 31, 2018.

* cited by examiner

*Fig. 3C*
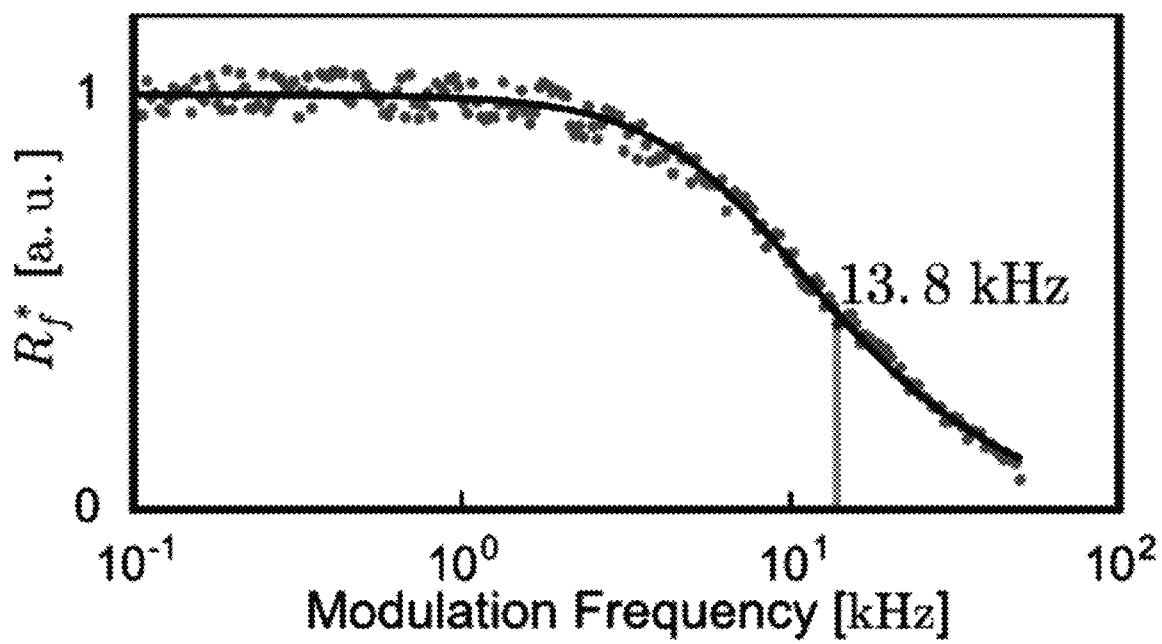
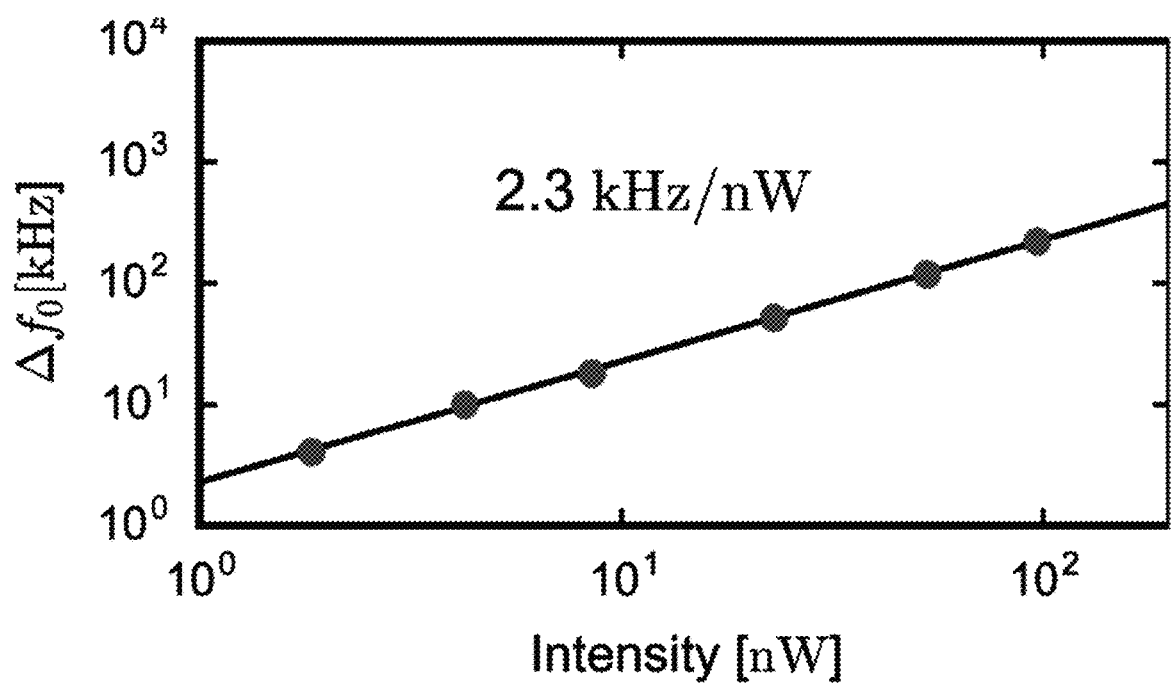
*Fig. 3D*

Fig. 4
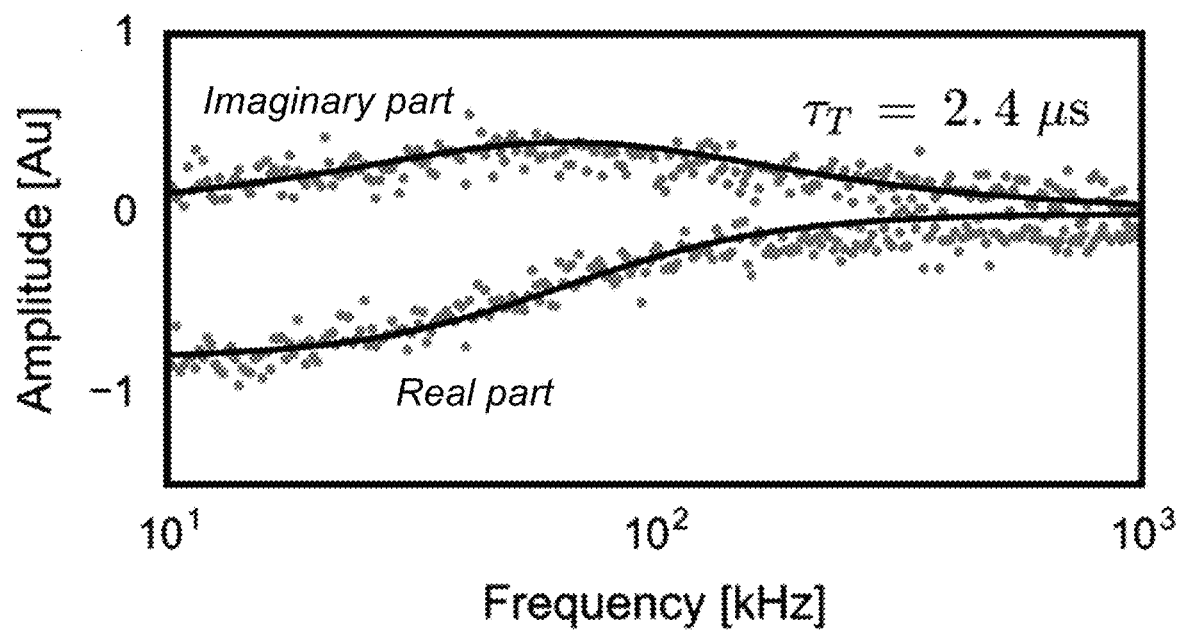
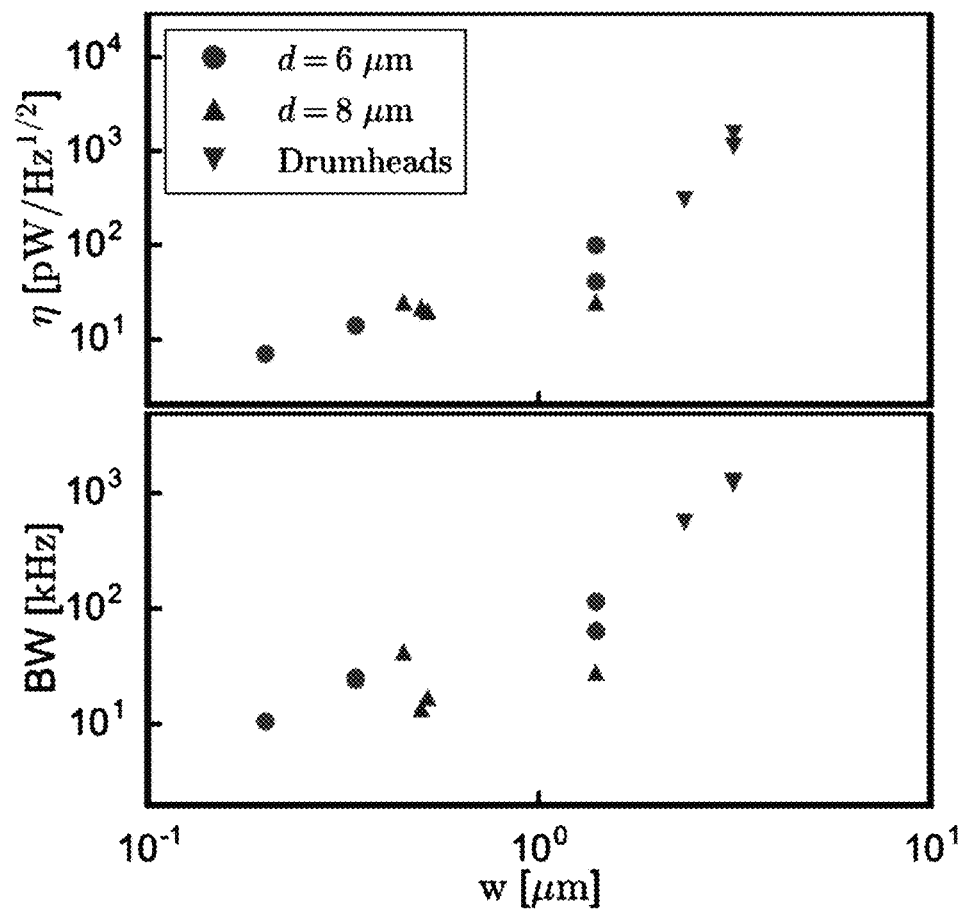
Fig. 5A
Fig. 5B

GRAPHENE NANOMECHANICAL RADIATION DETECTOR

CROSS-REFERENCE TO RELATED APPLICATIONS

This application claims priority from U.S. Provisional Patent Application 62/640,552 filed Mar. 8, 2018, which is incorporated herein by reference.

STATEMENT REGARDING FEDERALLY SPONSORED RESEARCH OR DEVELOPMENT

This invention was made with Government support under contract DMR-1532225 awarded by the National Science Foundation. The Government has certain rights in the invention.

FIELD OF THE INVENTION

The present invention relates generally to devices and techniques for detecting radiation. More specifically, the invention relates to microbolometers.

BACKGROUND OF THE INVENTION

Bolometers are sensors that measure the power of incident radiation by detecting the heating of a material. They are widely used in astronomy, particle physics, and thermal imaging, and are especially useful in the IR and THz spectral bands which cannot be detected by silicon-based p-n junction photodiodes due to silicon's bandgap. Bolometers have superior spectral bandwidth, i.e., they are sensitive to a broad range of wavelengths not accessible to p-n junctions.

To measure incident radiation, which may be light or energetic particles, bolometers measure a temperature increase in a radiation absorbing material, conventionally by detecting a change in electrical resistivity. For example, microbolometers detector elements in thermal imaging sensors are typically made of vanadium oxide or amorphous silicon deposited on silicon. These materials have temperature-dependent resistance. Thus, incident radiation absorbed by the vanadium oxide or amorphous silicon can be detected by measuring changes in electrical resistance of the elements. The performance of these types of bolometers depends on the properties of the material used, e.g., absorbance spectrum, sensitivity of resistance upon absorbed energy, and thermal noise at operating temperature.

Graphene has some attractive properties for use as a material in conventional bolometers. Unfortunately, however, graphene has a weak temperature dependent resistivity, varying less than 10% across a temperature range of 1.6-300 K. Although there are approaches to address this problem, these techniques require cryogenic temperatures. Thus, despite its other desirable properties, its weak temperature dependent resistivity prevents graphene from being useful in conventional resistivity-based bolometry at higher temperatures.

BRIEF SUMMARY OF THE INVENTION

In a departure from conventional resistivity-based bolometry, the present invention provides a fundamentally new way of using a graphene absorber to implement a bolometer: instead of detecting a change in electrical resistivity of a fixed graphene layer, a change in the mechanical resonance of a suspended graphene absorber is detected. In other words, this suspended graphene nanomechanical-based bolometer senses radiation using a mechanical resonance-based temperature detection method instead of the conventional resistivity-based temperature detection.

Incident radiation absorbed by the suspended graphene absorber heats and thermally tensions it, thereby shifting its mechanical resonant frequency. The graphene resonator may be driven electronically and the resonance frequency shift due to incident radiation may be measured electronically or using optical interferometry. Alternatively, the actuation and detection may be both optical, or both electronic.

Using the resonant frequency as a readout for photodetection, these bolometers exhibit room-temperature noise-equivalent power of 2 $pW/Hz^{1/2}$, and bandwidth up to 1.3 MHz.

Suspended graphene resonators can operate at high temperatures, up to 1200 K, due to graphene's excellent thermal properties including a negative thermal expansion coefficient and high thermal conductivity. This bolometer design may be used to implement fast and high resolution bolometers at room temperature and above.

Furthermore, suspended graphene can be arbitrarily shaped to optimize its mechanical properties with a focused ion beam. Additionally, the fabrication of arrays of suspended graphene drumheads as described is straightforward and allows for sensor arrays which may have a variety of applications.

A thermo-mechanical resonating microbolometer device according to one embodiment of the invention comprises a graphene resonator suspended by silicon oxide supports above a metallic silicon substrate. The graphene resonator is attached to the silicon oxide supports by a collection of graphene tethers on its periphery, such that the graphene resonator forms a mechanical resonator in the direction normal to its surface. The tethers are preferably formed by removing regions surrounding the graphene resonator during the fabrication process. The graphene resonator and tethers preferably have a discrete rotational symmetry around a point at the center of the graphene resonator. The graphene resonator preferably has a diameter between 1 and 10 microns, and a thickness preferably less than 1 nm. More preferably, the graphene resonator is a monolayer of carbon atoms. Microelectronic circuitry electrically connected to the graphene resonator and the metallic silicon substrate is configured to drive electronically the motion of the graphene layer using capacitive force, and similarly to measure the motion of the graphene layer, and thereby determine shifts in the mechanical resonant frequency of the graphene layer due to incident radiation. Embodiments of the invention also include arrays of these graphene resonator elements. The resonator can also be intentionally coated with different thin films to increase absorption. Bi-layer graphene is also a good choice because it easier to transfer than single-layer graphene and has a larger absorption. Other 2D materials are possible as well; the advantage is better absorption, lower thermal conductivity, and larger thermal expansion; the drawback is reduced spectral bandwidth. Potential 2D materials include the 2D transition metal dichalcogenides ($MoS_2$, $MoSe_2$, $WS_2$, $WSe_2$, etc.), hexagonal boron nitride, 2D xene compounds (phosphorene, silicene, etc.), and fluorinated graphene.

BRIEF DESCRIPTION OF THE SEVERAL VIEWS OF THE DRAWINGS

FIG. 1A is a schematic illustration of an embodiment of a bolometer that senses incident radiation by measuring shifts in the resonant frequency of a micromechanical graphene absorber suspended by four tethers above a cylindrical well, according to an embodiment of the invention.

FIG. 3C is a graph of the resonance shift of a microbolometer as the radiation modulation frequency is increased, according to an embodiment of the invention.

FIG. 3D is a graph of resonance shift of a microbolometer as the heating radiation power is increased, according to an embodiment of the invention.

FIG. 4. is a graph of the real and imaginary amplitudes of thermal expansion induced displacement with respect to frequency of a heating laser driven at low frequencies, according to an embodiment of the invention.

FIG. 5A is a graph of sensitivity vs. tether width for various trampoline and drumhead designs for absorbers, according to embodiments of the invention.

FIG. 5B is a graph of bandwidth vs. tether width for various devices according to the invention.

DETAILED DESCRIPTION OF THE INVENTION

Figure 1B:
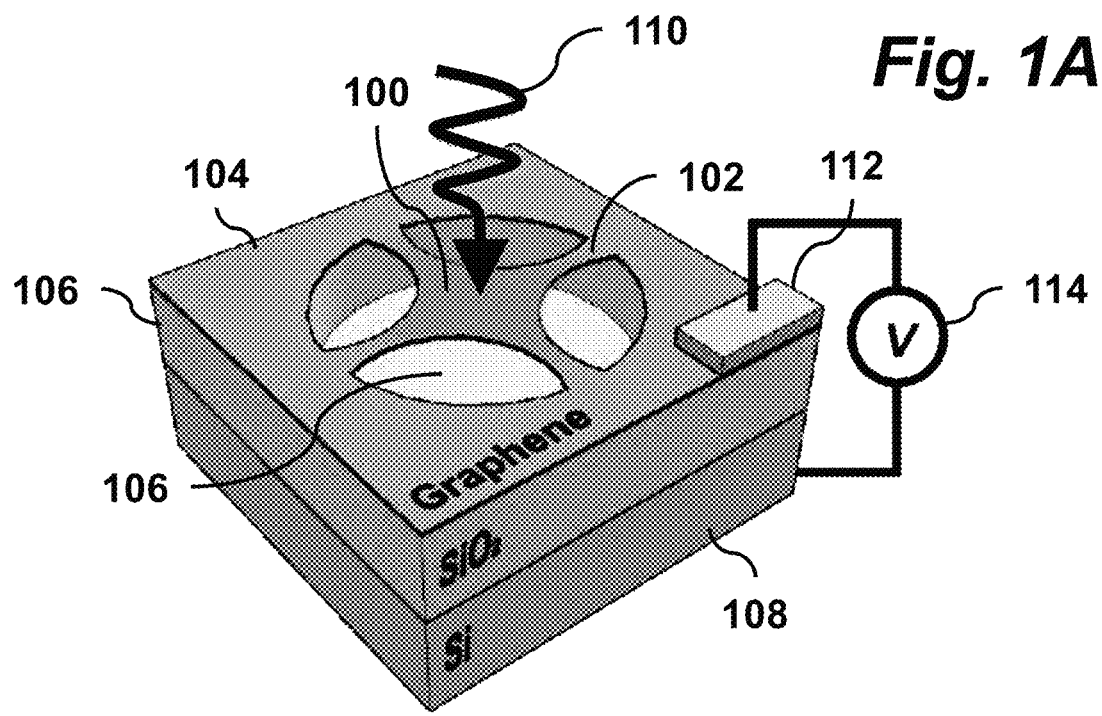
FIG. 1B is a scanning electron microscope image of a thermo-mechanical microbolometer, according to an embodiment of the invention.

FIG. 1A is a schematic illustration of an embodiment of a bolometer that senses incident radiation 110 by measuring shifts in the resonant frequency of a micromechanical graphene absorber 100 suspended by four tethers 102 above a cylindrical well 106. The absorber and tethers are fabricated from a single atomic layer of carbon, i.e., a graphene layer 104. The absorber 100 and tethers 102 are suspended above the well 106 while the rest of the graphene layer 104 is deposited on supporting layer of $SiO_2$ 106 which in turn is deposited on a layer of Si 10. The suspended absorber 100 is free to mechanically vibrate above the well 106, so that its distance above the bottom of the well changes periodically with time. When the graphene 100 absorbs incident radiation 110, it warms up. Due to graphene's negative thermal expansion coefficient, this increase in temperature increases the mechanical tension of the graphene, which changes the resonant frequency of its mechanical vibration. Thus, radiation can be detected by measuring changes in how the graphene drum vibrates. An electrical contact 112 on the graphene layer 104 allows application of a voltage 114 between the absorber 100 and Si layer 108 below. This allows both AC electrical driving of the absorber vibration together with a DC bias to be applied, and detection of the absorber resonant frequency shift due to incident radiation 110.

The bolometer has a unique combination of sensitivity, broad spectral bandwidth, high-temperature operation, and speed. Graphene absorbs light uniformly from the ultraviolet to radio, including infrared. Since graphene possesses the smallest possible mass per unit area ($10^{-15}$ g/$\mu m^2$) of any material, the resonant frequency shift caused by a given temperature increase is enormous, making the device ultrasensitive to light. Due to graphene's extremely high thermal conductivity and the high resonant frequencies (typically >10 MHz), the device is incredibly fast, letting it resolve short 100 nanosecond pulses of light.

The device may be fabricated using standard semiconductor processing techniques and optical lithography. In preferred embodiments, each device has a well diameter ranging from 1-10 $\mu m$. Large high density arrays of such detectors may be made.

In one illustrative example, the fabrication includes growing a 1 $\mu m$ thick layer of wet thermal oxide on degenerately doped Si wafers. Next, 7 $\mu m$ diameter holes, 600 nm deep, are patterned with photolithography and dry inductively coupled plasma (ICP) etching. By leaving 400 nm thick layer of oxide intact, any accidentally collapsed graphene could not cause a short between the suspended graphene and the silicon. Metal contacts are then patterned using photolithography, 5/50 nm Ti/Pt evaporation, and acetone liftoff. A polymer transfer technique was used to place a sheet of graphene over the exposed holes and metal contacts. This architecture application of both an AC and DC electrical bias between the graphene and the backside silicon in order to provide a means to electrically drive mechanical motion of the absorber and to change the tension in the suspended graphene.

Figure 1C:
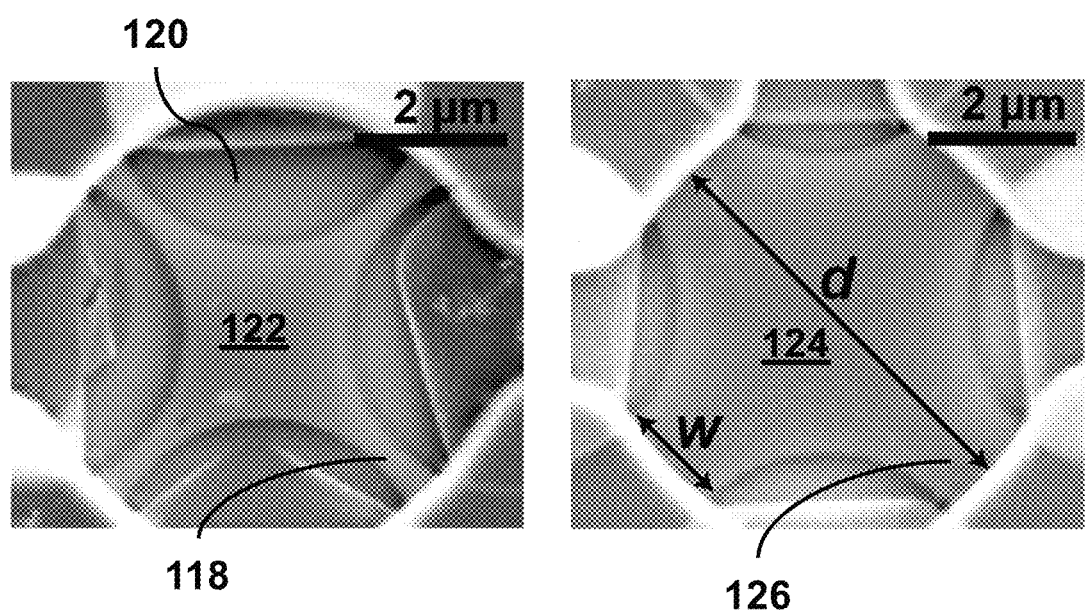
FIG. 1C is a scanning electron microscope image of a thermo-mechanical microbolometer, according to another embodiment of the invention.

The shape of the graphene absorber influences the bolometric sensitivity by altering its thermal resistance. Preferred embodiments have a shape resembling a trampoline shape, i.e., a central absorber region having multiple comparatively narrow tethers extending outward to the rest of the graphene layer supported by the SiO layer. In this trampoline geometry, heat flow is restricted to the four narrow tethers. The graphene is shaped into this trampoline shape with a focused to ion beam. As shown in the scanning electron microscope image of FIG. 1B, four circles 120 were cut into the graphene to make the absorber 122 and tethers 118. A typical ion dose to mill through the graphene with Gallium ions is 8.5-17 pC/$\mu m^2$. The four circles were positioned symmetrically around the center of the absorber 122. This cutting design was found to have near 100% fabrication success. FIG. 1C illustrates another trampoline geometry, with a larger central absorber region 124 and four thicker tethers 126. The two designs have the same diameter d=6 $\mu m$, but different tether widths w=0.2 $\mu m$ and w=1.4 $\mu m$.

Figure 1D:
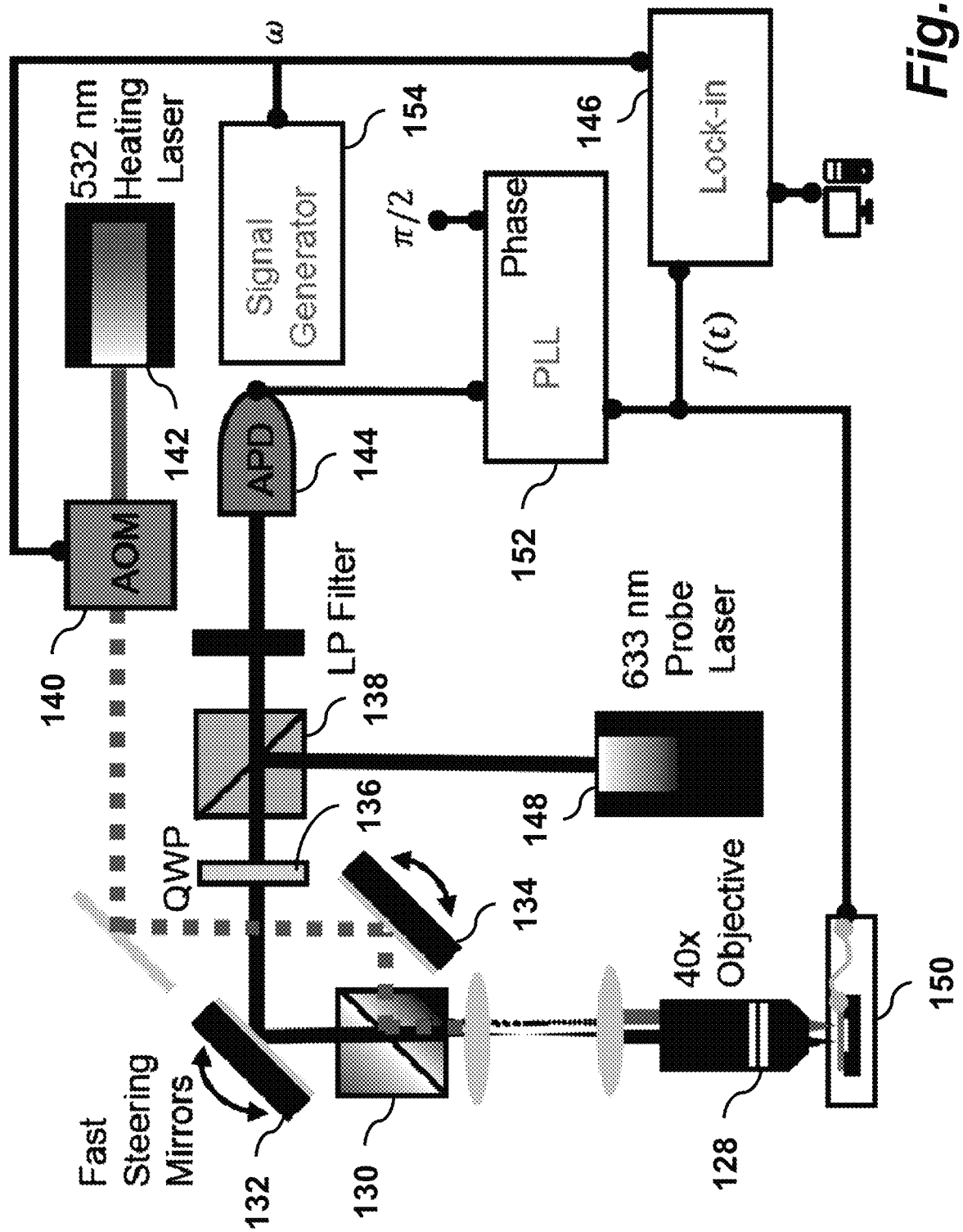
FIG. 1D is a schematic diagram of an optical interferometric setup used to actuate, apply radiation, and detect motion of a suspended graphene absorber in a microbolometer, according to an embodiment of the invention.

In some embodiments, the mechanical amplitude of the suspended graphene is measured using interferometry and lock-in amplification. FIG. 1D is a schematic diagram of an optical setup used to actuate, apply radiation, and detect motion of a suspended graphene absorber. A 633 nm probe laser 148 was directed through a polarizing beam splitter 138, quarter wave plate 136, fast steering mirror 132, wavelength selective reflector 130 and objective lens 128 to focus it onto the graphene bolometer 150. The suspended graphene absorber and the silicon substrate form an optical cavity. The reflected light follows the reverse path until it reaches polarizing beam splitter 138 where, instead of being reflected back to probe laser 148, the reflected light is transmitted to silicon avalanche photodiode 144 where it is measured. The measured resonator amplitude signal is fed from the avalanche photodiode 144 to a phase lock loop 152 and lock-in amplifier 146 referenced to an applied AC electrical drive signal from signal generator 154. To test the device, heating radiation is applied using a 532 nm laser 142 whose intensity is modulated with an acousto-optic modulator 140 connected to a second lock-in amplifier 146. The modulated beam is directed by fast steering mirror 134 to wavelength selective reflector 130 where it joins the path of the probe beam through the objective lens 128 to the graphene bolometer 150. Both the probe and heating lasers could be accurately positioned on the sample using to fast scanning mirrors and scan lenses.

Frequency modulation (FM) was used with a phase locked loop (PLL) to track the resonant frequency with time. Using FM detection has the advantage over amplitude modulation detection methods because the bandwidth is not limited by the mechanical damping rate. The mechanical resonance shifts instantaneously when an external force is applied and the feedback loop on the PLL is able to adjust to this new resonance quickly whereas any change in amplitude is slowed by the damping rate.

Figure 2A:
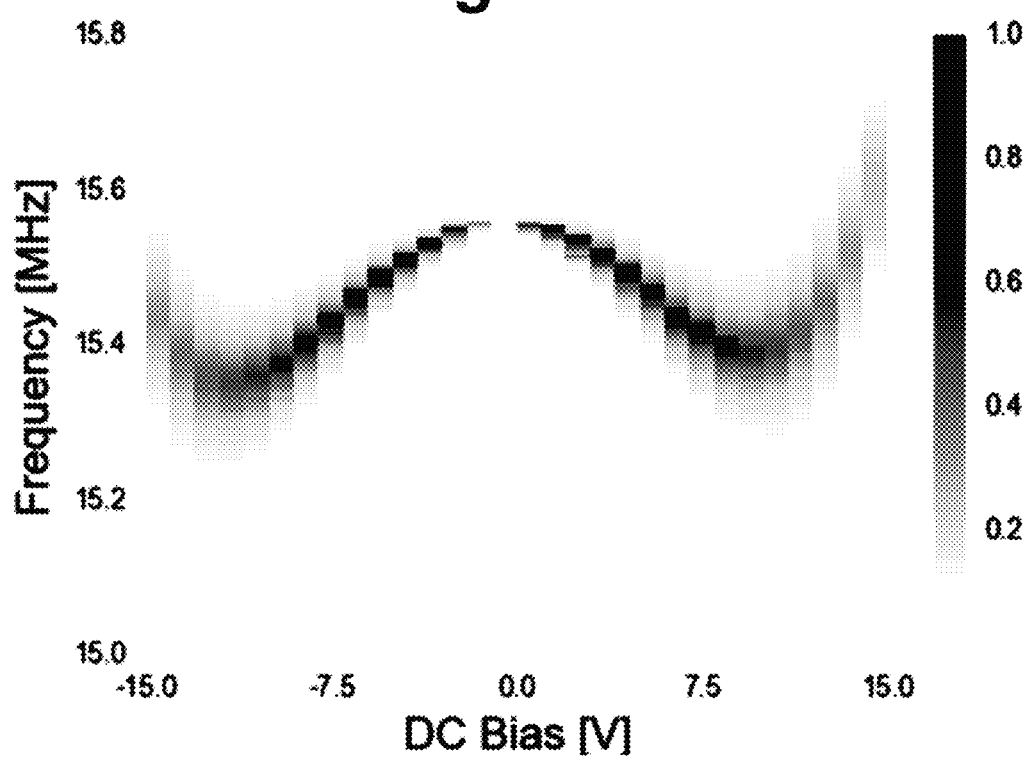
FIG. 2A is a graph of amplitude response vs applied DC bias and drive frequency, illustrating how the mechanical resonance frequency of the graphene absorber depends on the applied DC bias, according to an embodiment of the invention.
Figure 2B:
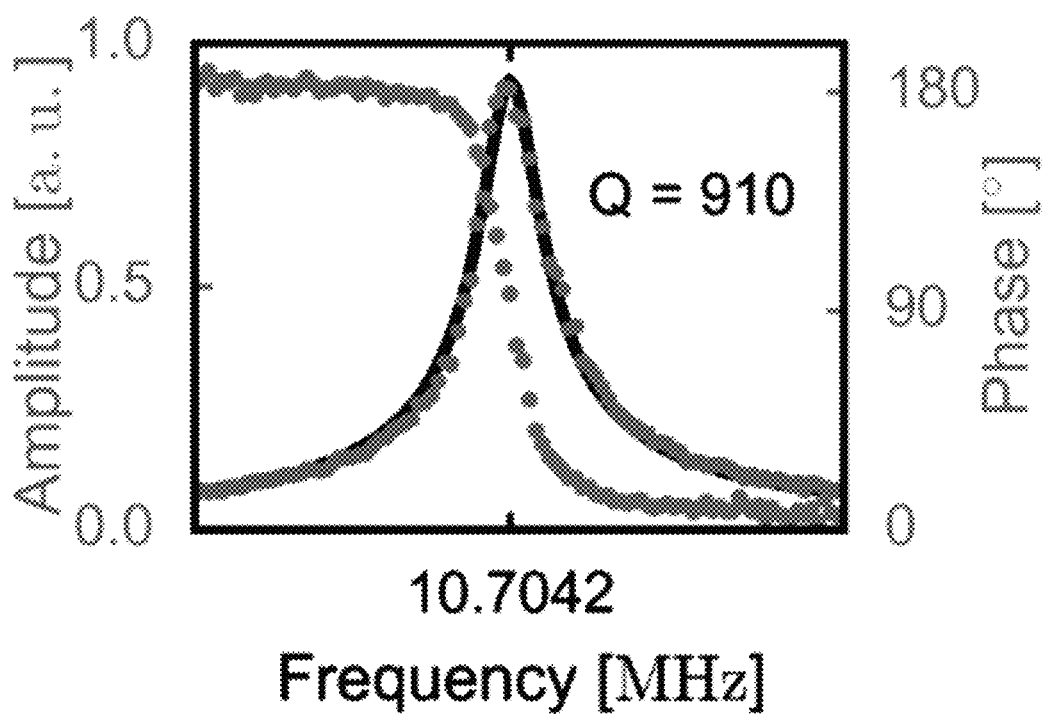
FIG. 2B is a graph of an amplitude frequency response curve for a microbolometer, according to an embodiment of the invention.

FIG. 2A is a graph of amplitude response vs applied DC bias and drive frequency, which shows how the mechanical resonance frequency of the graphene absorber depends on the applied DC bias, in an embodiment using hybrid electrical driving and optical readout. (In an all-optical embodiment, no bias is needed.) At zero applied bias no mechanical amplitude is observed because only the cross term between the AC and DC bias induces motion at the drive frequency. As the DC bias is increased, capacitive softening is observed that downshifts the mechanical resonance frequency at low voltages. As the voltage is increased further, the graphene is pulled towards the silicon, tightening the graphene, which increases the mechanical resonance. Additionally, the quality factor is found to drop with gate voltage. FIG. 2B shows an amplitude-frequency response curve at 0.25 V bias, where there is a quality factor fit of Q=910. The frequency the AC driving voltage is swept as the mechanical amplitude response is measured. A best fit for a damped driven oscillator is used to calculate the resonance frequency of 10.7 MHz and quality factor. For bolometry operation, the mechanical properties are measured with a DC bias voltage of 1 V in order to effectively actuate motion while still maintaining a higher quality factor. The AC driving voltage was increased to just before the onset of nonlinearity so that the maximum signal could be obtained.

Figure 3A:
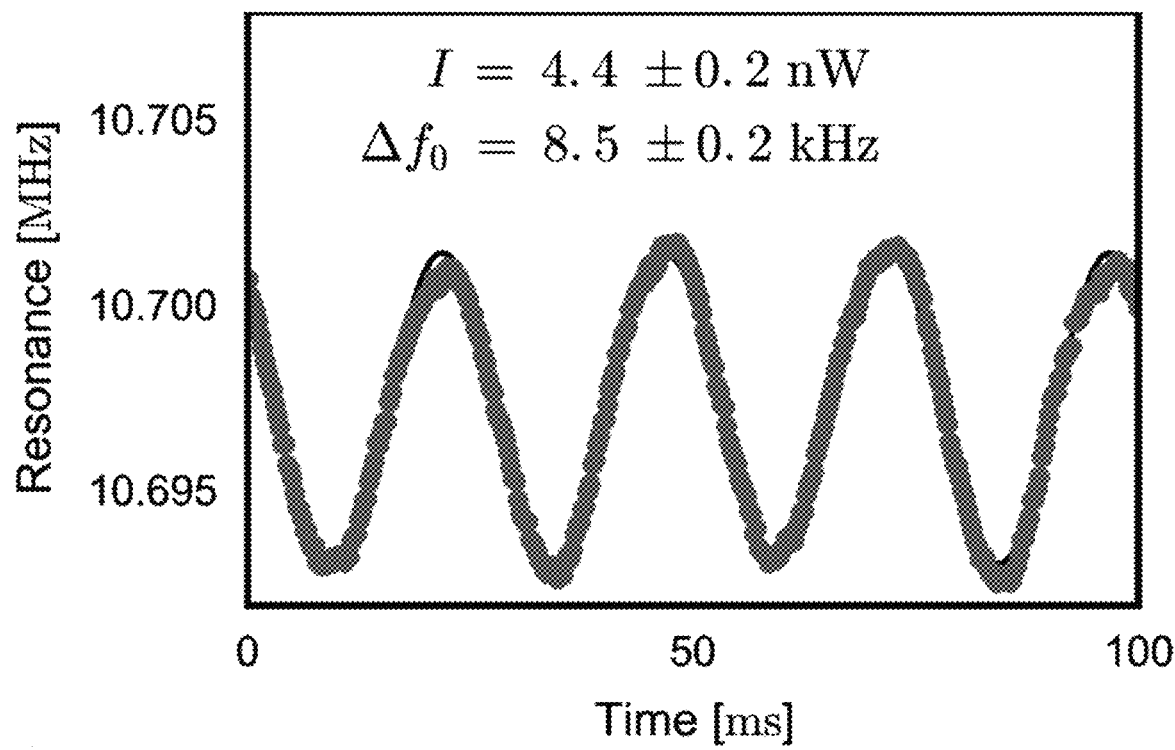
FIG. 3A is a graph of mechanical resonance frequency vs time as modulated heating radiation modulated is directed at a microbolometer, according to an embodiment of the invention.
Figure 3B:
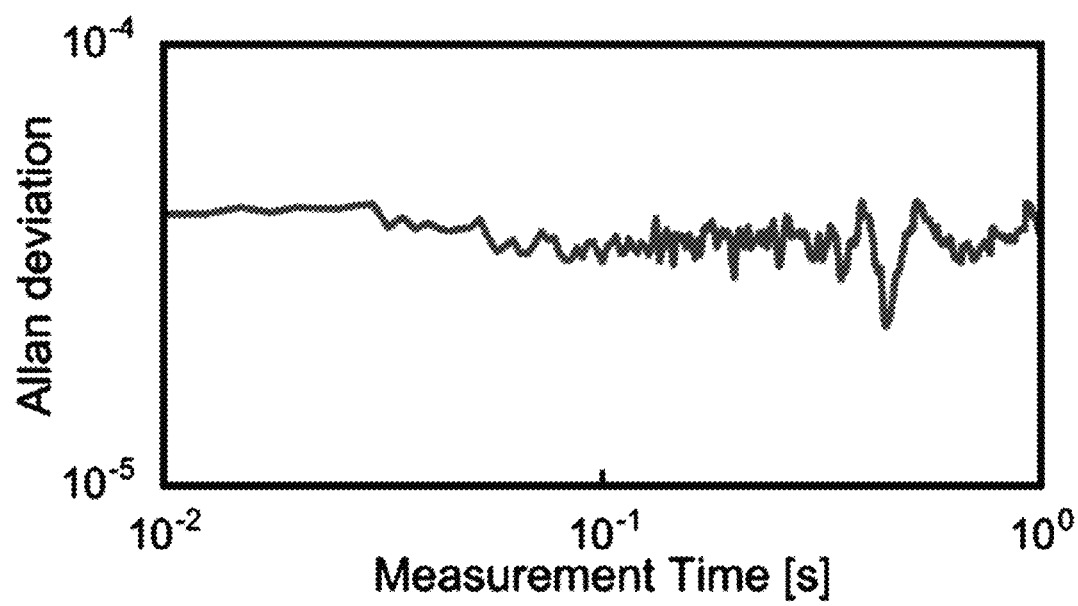
FIG. 3B is a graph of Allan deviation vs measurement time for a microbolometer, according to an embodiment of the invention.

FIG. 3A is a graph of mechanical resonance frequency vs time as 190 nW heating radiation modulated at 40 Hz is directed at the bolometer. By modulating the heating radiation any slow substrate heating effect is removed from the measurement. A sine wave is fit to the resonance vs time data to extract the total change in resonant frequency per unit of heating radiation, which we calculated to be 52.5 kHz/μW. A useful metric is the frequency shift thermal responsivity, $$R_f = \frac{\Delta f_0}{f_0} \frac{1}{I}$$

which is the relative change in resonant frequency per unit of heating radiation intensity. FIG. 3D is a graph of resonance shift $\Delta f_0$ due to absorption of radiation vs heating laser power between 1-100 nW as measured by the lock-in amplifier. Our most sensitive device, a 6 μm diameter trampoline with 200 nm wide tethers, had $R_f \sim 300,000$ W$^{-1}$, a factor 100 greater than existing nanomechanical bolometers. The fluctuations of the resonance frequency ($\sigma_f$) determine the noise-equivalent power per Hz$^{1/2}$ ($\eta$) of the device through the expression $\eta = \sigma_f \sqrt{t}/(f_0 R_f)$ where t is the measurement time. A routine measure of the fractional noise, $\sigma_f/f_0$, is the Allan deviation. To calculate the Allan deviation, the frequency of the graphene resonator is measured with a PLL while the heating laser is turned off, as shown in the graph of FIG. 3B for varying measurement intervals. Using the Allan deviation (measured at 100 Hz), we calculate $\eta$ for various devices. For drumheads, which lack tethers, $\eta \sim 1$ nW/Hz$^{1/2}$, which is over 200 times less sensitive than trampolines. A 6 μm diameter trampoline with the narrowest tether width (200 nm) has the lowest noise-equivalent power, $\eta = 2$ pW/Hz$^{1/2}$ (at 1 kHz). As shown in FIG. 5A, the noise-equivalent power $\eta$ for trampolines of a fixed diameter decreases with narrower tether width, which agrees well with the linear prediction, $\eta \propto w$ (see SI for modeling). Therefore, reducing the tether width improves the $\eta$ of our device. The $\eta = 2$ pW/Hz$^{1/2}$ of the 200 nm tether width device is the lowest reported value of noise-equivalent power for a room-temperature graphene bolometer to date.

Another important metric in a bolometer is the response bandwidth, which determines its ability to detect transient signals and fast variations of the radiation intensity. To characterize the bandwidth, we vary the frequency ($f_m$) of the amplitude-modulated heating laser and determine the frequency spectrum of $R_f$, as shown in FIG. 3C for a trampoline with 500 nm wide tethers. We infer the bandwidth (BW) from the 3 dB roll-off of $R_f$. FIG. 3C shows measured resonance shift as 40 Hz of 190 nW of peak heating radiation is applied while sweeping the modulation frequency from 100 Hz to 50 kHz. The total resonance shift was found to be constant for low modulation frequency and reached half its maximum value at 13.8 kHz. A thermal circuit model was used to fit the thermal response time of the trampoline. The spectrum in FIG. 3C has a nearly flat response up to its 3 dB bandwidth of 13.8 kHz. Thus, this device can detect light up to ~13.8 kHz with little degradation in sensitivity. FIG. 5B is a graph of the BW vs. w for various devices. For devices with bandwidths above 30 kHz, we used an off-resonant procedure to determine the bandwidth. The bandwidth of trampolines ranged between 10-100 kHz, while the drumheads have bandwidth as high as 1.3 MHz. The variation in response bandwidth is strongly correlated to tether width: wider tethers produce a faster response, agreeing well with the prediction BW $\propto$ w/C. The bandwidths that we report for the bolometer are remarkable for a bolometer that measures lattice temperature, and are a direct consequence of graphene's ultralow C.

For a bolometer that could respond faster than ~30 kHz we used an off-resonant method to estimate the bandwidth. For these cases, we were unable to measure the bandwidth by looking at the change in frequency shift with the phase locked loop (PLL), because the bandwidth of the PLL is unable to track changes in resonance frequency at high frequencies. For these cases, we infer bandwidth using thermomechanics. For this measurement, we modulate the heating laser at frequencies below mechanical resonance without applying any electrical actuation. In this regime, the mechanical amplitude is assumed to be proportional to the change in temperature, A $\propto \Delta$T, by first order thermal expansion. FIG. 4 is a graph of the real and imaginary amplitudes (defined by the phase difference between the mechanical amplitude and the heating laser intensity) of thermal expansion induced displacement for a trampoline design with tether widths of 1.4 μm.

The sensitivity of the bolometer is substantially constant across a wide spectral bandwidth due to graphene's broadband spectral absorbance. Furthermore, this device can operate at temperatures up to 1200K, due to the thermal and mechanical properties of graphene. To further improve the sensitivity, embodiments can have the graphene absorber placed inside an optical cavity to increase the total absorption from graphene's intrinsic 2.3%.

In contrast to the electrical resistance of graphene, the bolometer's mechanical resonant frequency possesses a strong temperature dependence. The temperature change per unit of absorbed power is very large due to the extremely high thermal resistance ($R_T$) of suspended graphene absorber. To obtain large values of $R_T$, the suspended graphene is preferably shaped with a trampoline geometry, i.e., a central region with narrow, tapered tethers, e.g., as narrow as 200 nm wide or less. The relationship between the tether width (w) and the thermal resistance is $R_T \propto 1/w$. Therefore, for the trampoline absorbers, the noise-equivalent power will be $\eta \propto w$ and the response bandwidth will be $BW \propto w/C$. As a result of the ability to generate narrow tethers and graphene's ultralow C, these absorber designs give the bolometer excellent speed and sensitivity.

The simplest way to improve $\propto$ is to reduce the tether width, which can be narrowed down to ~10 nm using FIB, or to use FIB to create lattice defects in the tethers, thereby increasing $R_T$. Taken together, these changes could bring the noise-equivalent power down to the regime of femtowatt sensitivity with 100 Hz response bandwidth.

FIG. 5A is a graph of sensitivity vs. tether width for 9 different trampolines and 3 different drumheads. For the drumheads, the tether width is taken to be as ¼ of their diameter. FIG. 5B is a graph of 3 dB bandwidth vs. tether width for 9 different trampolines and 3 different drumheads. For the drumheads, the tether width is taken to be ¼ of the drumhead diameter.

The fabrication of the bolometers used here is scalable and could be used to make dense bolometer arrays. The process used to make the bolometer devices involves a single-step transfer of CVD graphene on a lithographically defined resonator support frame. Graphene transfer and lithography are both routine processing steps in high-yield, large-scale commercial fabrication. Although FIB is not as scalable as optical lithography, modern FIB, much like e-beam lithography, is to used in commercial applications. Therefore, these bolometer trampolines, which only require a fast, single-pass vector cut, could be made quickly and in large numbers. Bolometers with drumhead (circular) shaped absorbers, while not as sensitive as trampolines, do not require FIB shaping and are routinely fabricated in large arrays, and thus could be especially useful for high-speed applications.

The bolometer may be operated with a combination electronic actuation and optical read-out, as detailed above. Alternatively, the bolometer could be fully integrated with on-chip electrical detection and actuation, allowing it to operate as a stand-alone, packaged technology.

All electronic actuation/detection can be achieved in a few ways. One is to use a Vector Network Analyzer (VNA); the VNA measures transmitted or reflected radio-frequency signals. The graphene bolometer will absorb power near its resonance frequency, which shows up as a dip in the VNA transmission curve. The VNA thus does actuation and detection in one step. The "terminals" of the device are the graphene and metal back-gate. The VNA is used to also track the frequency of the graphene resonator. VNA techniques are very common in MEMS/NEMS. Another approach is to use the AC gate voltage to drive the resonator, but use the higher harmonic of the force. The higher harmonic allows driving at half the resonance frequency but detecting at the resonance frequency. The detection uses Lock-in, but the signal comes from the terminals of the device and not from a silicon photodetector output.

All-electronic actuation and detection can improve performance at room temperature. In addition, performance of the device can be improved at room temperature by photothermal (non-cryogenic) cooling, non-linear drive, geometric shaping, use of other 2-D materials (e.g. transition metal dichalcogenides, hexagonal boron nitride, xene compounds, fluorinated to graphene, etc.), and deposition of absorption enhancing materials. Together, these improvements could achieve sensitivities in the attowatt regime ($10^{-18}$ W).

Embodiments of the invention may also use all-optical actuation/detection using techniques described in David Miller, Benjamin Alemán. 2D Materials, 4 (2), 025101 (2017). Briefly, to measure motion, a HeNe laser (633 nm) and optical interferometry are used. To drive motion, a second laser of any wavelength reasonably far from the 633 nm wavelength of the HeNe is used. The drive laser is modulated using an acousto-optical modulator. The graphene resonator will vibrate when the modulation frequency is close to the resonance frequency of the graphene resonator.

The same frequency-shift sensing mechanism that we use to detect optical power will also inherently respond to mass, charge, and force. So, this bolometer offers the unique opportunity for multi-mode NEMS sensing, which hybridizes ultrasensitive detection of power with ultrasensitive mass, charge, or force detection. Furthermore, the bolometer is capable of multi-mode sensing with a single NEMS device and with no further modifications to the device architecture. Using multi-mode sensing, for example, the bolometer could simultaneously detect the mass and energy of an incident particle by detecting the transient frequency shift (from the absorbed kinetic energy) and the steady state frequency shift (from the added mass). As consequence of independently measuring the mass and energy of a particle, the bolometer would provide a novel means to measure the momentum of atoms and elementary particles.

The invention claimed is:

1. A thermo-mechanical resonating radiation detector comprising:
   a silicon substrate;
   a graphene resonator having a diameter d;
   graphene tethers attached to the graphene resonator, wherein the graphene tethers extend outward from the graphene resonator, have a tapered shape, and have minimum widths w less than the diameter d of the graphene resonator;
   silicon dioxide supports between the silicon substrate and the graphene tethers, supporting the tethers to suspend the graphene resonator above a cylindrical well formed within a silicon dioxide layer on the silicon substrate, such that the graphene resonator forms a mechanical resonator;
   microelectronic circuitry electrically connecting the graphene resonator and the silicon substrate.

2. The thermo-mechanical resonating radiation detector of claim 1 wherein the graphene resonator has a thickness less than 1 nm.

3. The thermo-mechanical resonating radiation detector of claim 1 wherein the graphene resonator is a monolayer of carbon atoms.

4. The thermo-mechanical resonating radiation detector of claim 1 wherein the graphene resonator has a diameter in the range 1-10 µm.

5. The thermo-mechanical resonating radiation detector of claim 1 wherein the minimum width w is at most 820 nm.

6. The thermo-mechanical resonating radiation detector of claim 1 wherein the graphene resonator and the graphene tethers have a discrete rotational symmetry around a point in a plane of the graphene resonator.

7. The thermo-mechanical resonating radiation detector of claim 1 further comprising a probe laser, optical interferometer, and photodiode for measuring a resonant frequency of the graphene resonator.

8. The thermo-mechanical resonating radiation detector of claim 1 further comprising microelectronic circuitry electrically connected to the graphene resonator and the silicon substrate configured to drive electronically the motion of the graphene resonator using capacitive force, and to measure the motion of the graphene resonator, and thereby determine shifts in the mechanical resonant frequency of the graphene resonator due to incident radiation.

9. An array of radiation detectors, wherein each of the radiation detectors is the thermo-mechanical resonating radiation detector according to claim 1.

* * * * *